United States Patent [19]

Krueger

[11] Patent Number: 4,782,513
[45] Date of Patent: Nov. 1, 1988

[54] VOICE PROMPTED BAR CODE READING SATELLITE SYSTEM

[75] Inventor: Loren L. Krueger, Minnetonka, Minn.

[73] Assignee: Honeywell Inc., Minneapolis, Minn.

[21] Appl. No.: 68,681

[22] Filed: Jun. 30, 1987

[51] Int. Cl.$^4$ ............................................. H04M 1/15
[52] U.S. Cl. .................................... 379/110; 364/405
[58] Field of Search ......................... 379/110, 95, 104; 235/375, 385, 472, 382, 383; 364/405

[56] References Cited

U.S. PATENT DOCUMENTS

| | | |
|---|---|---|
| 4,281,380 | 7/1981 | DeMesa, III et al. |
| 4,348,551 | 9/1982 | Nakatani et al. |
| 4,369,334 | 1/1983 | Nakatani et al. |
| 4,398,250 | 8/1983 | Hosono . |
| 4,424,566 | 1/1984 | Tsuzuki . |
| 4,468,750 | 8/1984 | Chamoff et al. |
| 4,481,599 | 11/1984 | Ootsuka . |
| 4,502,120 | 2/1985 | Ohnishi et al. |
| 4,521,677 | 6/1985 | Sarwin ............................... 235/385 |

OTHER PUBLICATIONS

Fant, G. "Speech Technology-Research & Developement" Ericsson Review No. 3, 1985, pp. 100–107.
WST 1000 Spec Sheet, Digital Datacom, Inc. (2 pages).

Primary Examiner—Robert Lev
Attorney, Agent, or Firm—John G. Shudy, Jr.

[57] ABSTRACT

A bar code reading system with novel features of a centralized station having remote reading satellite stations. Each centralized station has a computer, bar code decoder for decoding bar code information from the satellite stations, and a voice synthesizer unit for transmitting prompts, English language instructions and messages to the satellite stations. Each satellite station has a bar code reading device and at least one loudspeaker, but neither a keyboard nor a character display.

19 Claims, 4 Drawing Sheets

VOICE PROMPTED BAR CODE READING SATELLITE SYSTEM

BACKGROUND OF THE INVENTION

The present invention relates to bar code reading devices and particularly to bar code reading systems having a plurality of remote bar code reading stations. More particularly, the present invention concerns a system of satellite bar code reading stations having no keyboard or display.

The relevant art known to the inventor includes the Intermec satellite wand reading systems manufactured by Interface Mechanisms, Inc., of Lynnwood, Washington. These systems have remote scanning wand stations which operate on a "party line" basis with a single bar code reader. The system uses only tone-coded prompting with limited information transfer to the operator. Each of the wand stations has a light indicating a busy line when another is in use and a speaker solely for emitting an audible beep for each valid scan by the wand. These stations may be interconnected in a chain or star configuration. The Intermec systems have no keyboard or character display at the remote stations.

Related art also includes daisy chained data entry terminals. Some art has data entry devices with voice synthesis features. Certain art, Ootsuka U.S. Pat. No. 4,481,599, has voice synthesis prompting to provide the operator guidance particularly in conjunction with operation of an electronic cash register.

SUMMARY OF INVENTION

The present invention differs from the related art in that it has very low cost satellite data entry stations using neither keyboard nor character display, having no displayed message prompts, etc., and sharing centrally the decoding of data entries, voice synthesis and processing in a unique way.

The invention involves a computer transaction system having a central computer or transaction manager device with a serial input connected to a bar code signal decoding device and a serial output connected to a voice synthesis output device. The input and output devices are connected by a cable system to a plurality of daisy-chained satellite stations each equipped with an optical wand for reading bar codes and a speaker for voice prompting. Isolation switches in the stations allow only one satellite station to control signals over the cable system at a time.

One objective of the invention is to provide an inexpensive voice prompted bar code reader. Each bar code reader station has no processor, bar decoder or voice synthesizer of its own. All the stations share these items which are centralized. The satellite station has no programming capability. The centralized programming provides the voice messages, responses, etc., to the operator at the station. The satellite station provides the capability of keyboard and visual display without the expense of the latter.

Another objective of the invention is the ease and simplicity of its use for an ordinary worker or lay person. Transactions are easier to conduct without having to use a keyboard or display. The only interactive devices at the operator's satellite station are the optical reader and the loudspeaker. The bar code reader inputs the data and the synthesized voice responses, prompts, instructions, etc. as determined by the centralized software, provide the information that otherwise might be available on a display device. The programmability of the invention provides much flexibility in the kind of transaction or use of the device. The inventive stations can be operated by the visually impaired, non-readers, and the slightly trained. With appropriate selection of bar code printing, placement and reading techniques, the invention would be useful to conduct transactions in total darkness or in hostile environments or it could be used by persons wearing heavy protective clothing where keyboards and displays are impractical.

DESCRIPTION OF THE PREFERRED EMBODIMENT

Figure 1:
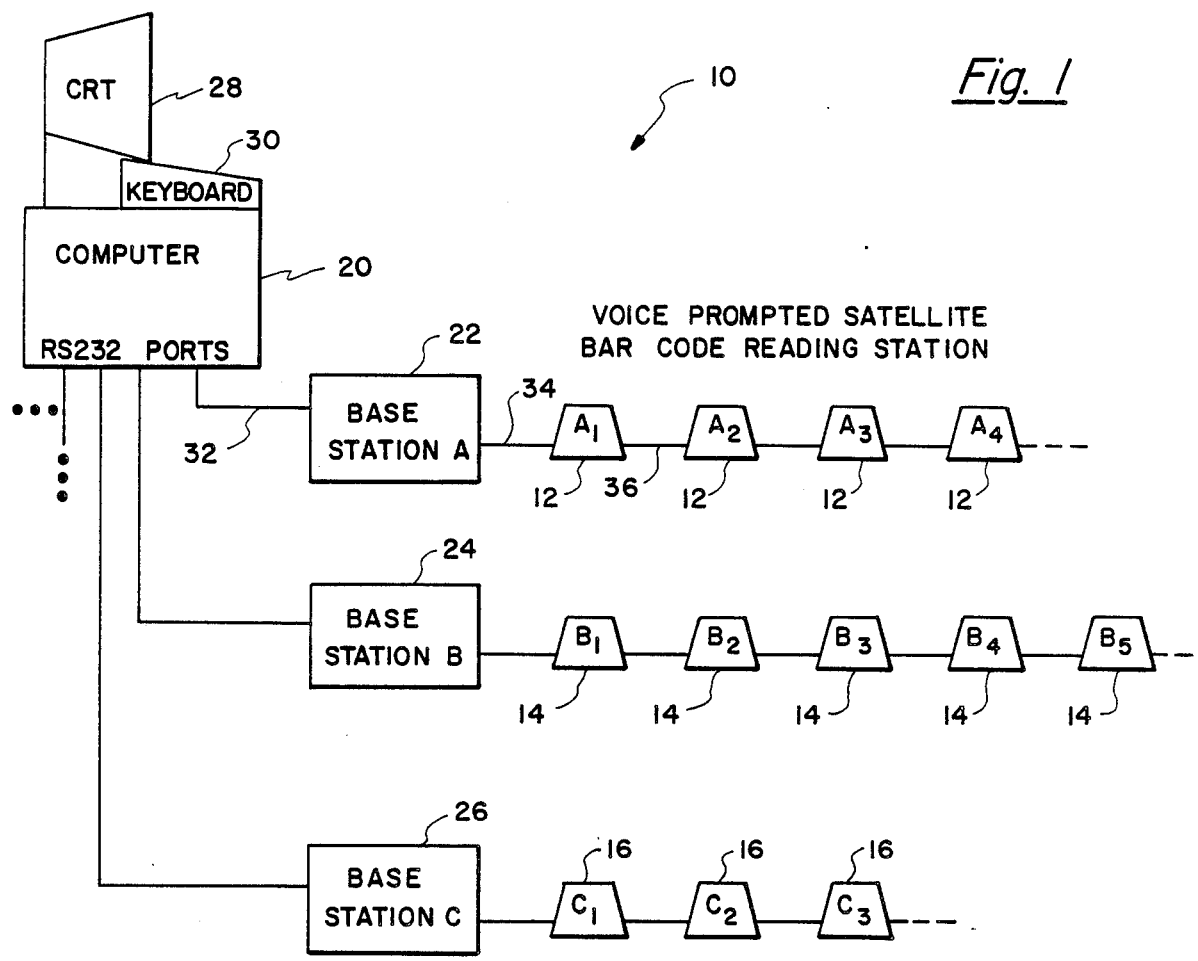
FIG. 1 is a block diagram of the invention.

FIG. 1 is an overview of the voice prompted bar code reading satellite system 10. The system 10 incorporates a number of voice prompted satellite bar code reading stations 12, 14 and 16, which are connected to lines extending out from base stations 22, 24 and 26, respectively. Base stations 22, 24 and 26 are connected to a computer 20 via RS-232 ports. Computer 20 has a cathode ray tube 28 for display purposes and a keyboard 30 for entry of information and data pertinent to the system. The bar code stations 12, 14 and 16 have a minimum of hardware which allows for convenient and remote scanning wands to operate on a "party line" basis. Only one satellite bar code reading station 12 of a party line group may function at a time. The same is true for the bar code reading station groups 14 and 16. In other words, one satellite station 12, 14 or 16, may operate per base station 22, 24 and 26. In the system 10 in FIG. 1, three bar code reading stations may operate at the same time, since there are three corresponding base stations. Additional satellite stations may simultaneously function in accordance with the number of additional base stations to the system 10.

Figure 2:
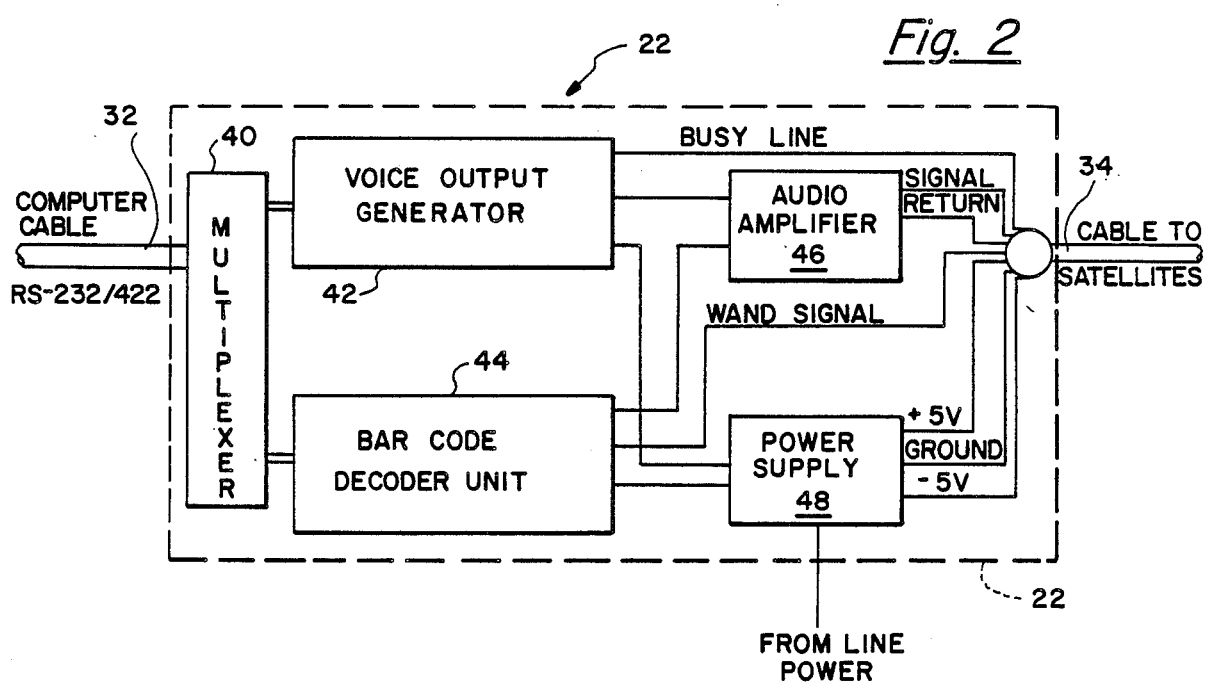
FIG. 2 is a diagram of a base station.

FIG. 2 illustrates base station 22. Base station 22 is connected to computer 20 via computer cable 32. The interface connection with computer 20 is an RS-232/422. Cable 34 connects base station 22 with satellites 12. Power supply 48 provides the power for the base station 22 and satellites 12 with at least a 5 volt supply and a −5 volt supply. Power supply 48 is connected to ordinary line power. Power supply 48 supplies power also for a voice output generator 42 and a bar code decoder unit 44. When one of the satellites 12 is in use, a wand signal is sent by the satellite 12 to base station 22. The wand signal from satellite 12 coming down cable 34 enters the bar code decoder unit 44 for decoding. This information from bar code decoder unit goes on to a multiplexer 40 and on down cable 32 to computer 20 for processing purposes. In response to the bar code information, the computer response by computer 20 is fed down cable 32 to a multiplexer 40 and on to the voice output generator 42, i.e., a voice synthesizer. The voice signal is fed from the voice output generator 42 onto audio amplifier 46 which sends the voice signal containing information pertinent to the transaction, on down cable 34 to the busy bar code satellite 12. The busy bar code satellite also puts out a busy line signal to all the other satellite stations of its party line group 12 when it gains control of the party line.

Figure 3:
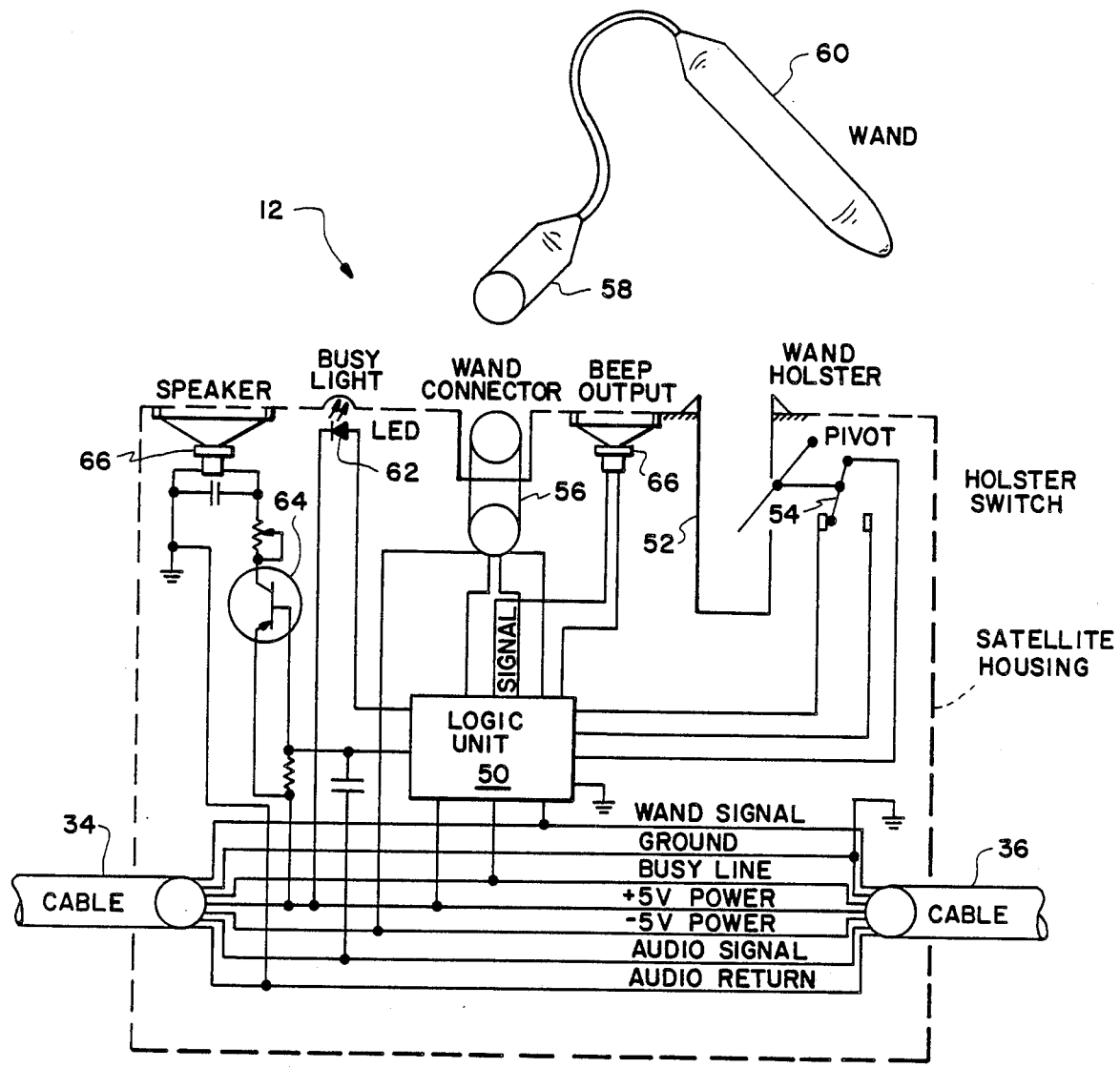
FIG. 3 is a diagram of a satellite station.

FIG. 3 is an illustration and schematic of a bar code reading satellite station 12. Satellite stations 14 and 16 are the same as satellite station 12. Cable 34 comes from base station 22 to satellite station 12. The wires of cable 34 and 36 are common throughout all the stations of each party line group. Wand 60 is a device which is utilized for reading bar codes. Other devices such as laser bar reading devices or other mechanisms capable of reading bar codes may be substituted for wand 60. Wand 60 is connected to satellite station 12 through a cable to connector 58 which is plugged into connector 56 of station 12. Connector 56 conveys a ground, 5 volts and −5 volts of power to wand 60. The line carrying the wand signal from wand 60 goes to logic unit 50. Wand 60 fits into wand holster 52 when not in use. When wand 60 is in wand holster 52 switch 54 changes position from one contact to another. Switch 54 is a single pole double throw having leads going to logic unit 50. Switch 54 may be substituted with other kinds of switches such as certain optical devices, sensors, etc. Busy light 62 is a light emitting diode. Light 62 may be any other appropriate signaling or light emitting device. The cathode of light 62 is connected to the busy line of cable 34 and 36. The anode of light 62 is connected to logic unit 50. Speaker relay 64 may be an electromechanical relay, optical coupler or other appropriate device capable of performing the desired function. Speaker transistor 64 connects speaker 66 by closing the circuit from audio signal line and audio return line of cable 34 and 36 to a speaker 66. Speaker transistor 64 has one line connected to the busy line of cable 34 and 36 and another line connected to logic unit 50. Logic unit 50 also has a ground connected to it. Item 64 can be a relay or other means. When busy light 62 is on at station 12 then station 12 cannot be activated for purposes of receiving prompts on the speaker or sending bar code signals through wand 60. Busy light 62 indicates that one of the other stations 12 is in use. When busy light 62 is off, station 12 may be used. Logic unit 50 of each station 12 in conjunction with base station 22 appropriately indicates when that station is busy and when its devices are enabled or disabled. The logic circuitry of logic unit 50 is designed so that when busy light 62 is on then speaker 66, wand 60, and holster switch 54 are disabled. When the busy light 62 is off, then speaker 66, wand 60, and holster switch 54 are enabled. If wand 60 is removed from wand holster 52 while the busy light 62 is on, then busy light 62 remains on until wand 60 is replaced in holster 52 thereby changing the position of holster switch 54. If wand 60 is removed from holster 52 with busy light 62 off, then a busy signal is sent to the busy line of cables 34 and 36 and received by other stations 12 and base station 22. However, when wand 60 is removed at a station 12 with busy light 62 off, station busy light 62 at that station 12 remains off although busy light 62 turns on at the other stations 12 on the string connected to base station 22. The above logic functions as performed by logic unit 50 may be designed with conventional logic circuit design techniques well known in the art. The string of stations 14 and their corresponding base station 24 and the string of stations 16 and corresponding base station 26 function similarly.

The busy signal to light 62 may be, by simple well-known methods and devices in the pertinent art, electronically transformed to a signal appropriate for audible receipt on speaker 66 in a fashion indicating to the satellite station 12 operator by a sound or tone that a line or a satellite station is busy. Thus, all information to the operator from satellite station 12 can be exclusively from speaker 66. However, two speakers 66 may be used, one for voice and another for a beep or tone such as a busy signal. All the information sent by the operator at satellite station 12 is exclusively by wand 60. This eliminates the need of any other information- or data-sending or receiving means such as a keyboard or visual display.

Figure 4:
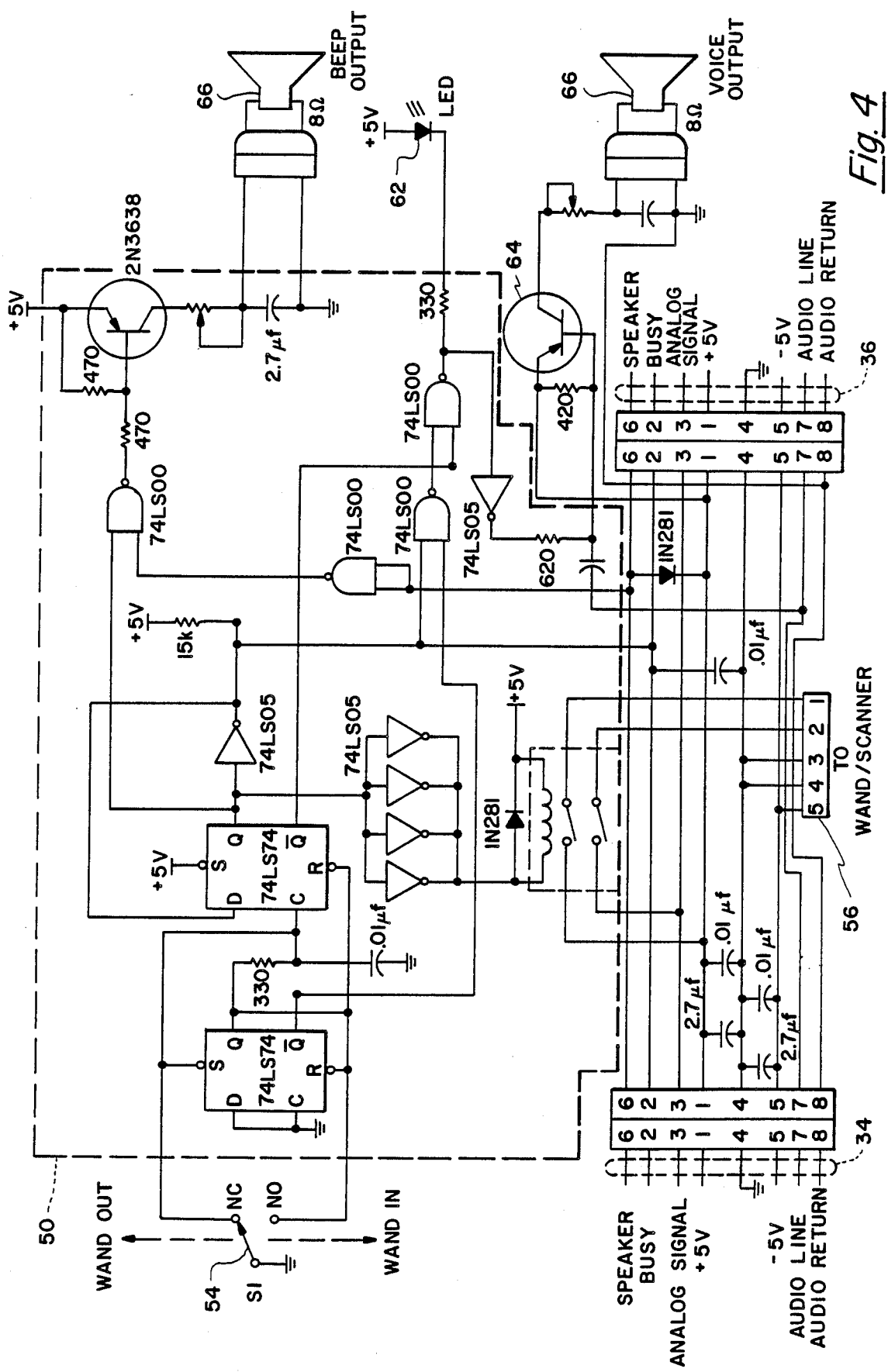
FIG. 4 is a diagram of a logic unit.

FIG. 4 shows the circuitry of logic unit 50. Logic unit 50 uses common logic elements and electronic components connected in a configuration to effect the desired above-noted logic functions for satellite station 12. All components of logic unit 50 are readily available in the market place.

Figure 5:
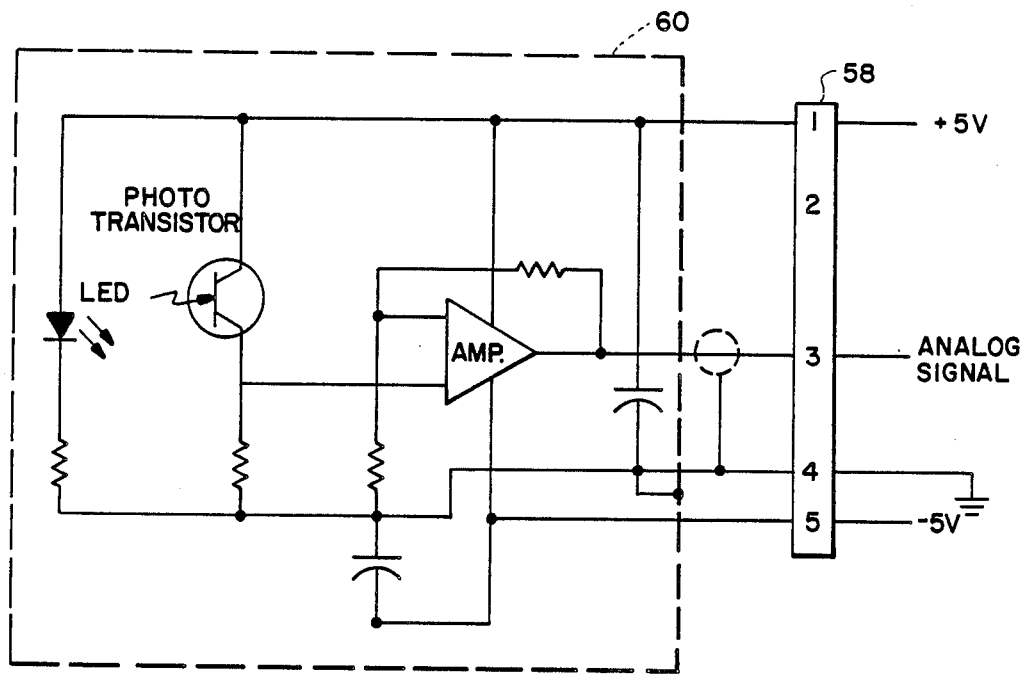
FIG. 5 is a schematic of a bar code reader.

FIG. 5 is a schematic of wand 60. This particular wand 60 or bar code reader 60 may be substituted with other types of bar code readers. An example is a model 1236 Ruby Wand light pen available from Interface Mechanisms, Inc., of Lynnwood, WA 98036.

The program steps for a voice prompted transaction using a satellite bar code reader with voice output are as follows:

| Operator Action | Satellite Station Response |
| --- | --- |
|  | 0. Idle Standby State. |
| 1. Pick up Bar Code Wand |  |
| 2. Scan Bar Code of User Identifier |  |
|  | 3. Voice Output Prompts: "Select Transaction Code" |
| 4. Scan Bar Code of Transaction Identifier |  |
|  | 5. Voice Output Prompts: "Select Function" |
| 6. Scan Bar Code of Function Selected |  |
|  | 7. Voice Output Prompts: "Read Tally Number" |
| 8. Scan Bar Code of Tally Number |  |
|  | 9. Voice Output Prompts: "Read Lot Number" |
| 10. Scan Bar Code of Lot Number |  |
|  | 11. Voice Output Prompts: "Read Op Number" |
| 12. Scan Bar Code of Op Number |  |
|  | 13. Voice Output Prompts: "Read Quantity - Digit by Digit, then End" |
| 14. Scan Bar Codes for successive digits of quantity, then scan "end" code. |  |
|  | 15. Voice Output Prompts: "Quantity is: (followed by digits of quantity scanned)" |
|  | 16. Voice Output Prompts: "Is this Correct?" |
| 17. Scan Bar Code for "yes" or "no". |  |
|  | 18. If "no", go to action 13 and continue from there. |
|  | 19. If "yes" Voice Output Prompts: "Please Enter Time: Hours then Minutes" |
| 20. Scan Bar Code for digits of time entry |  |

-continued

| Operator Action | Satellite Station Response |
|---|---|
| in hours and minutes. | |
| | 21. Voice Output Prompts: "Time for this entry is: (followed by voice output of hours digits and minutes digits)" |
| | 22. Voice Output Prompts: "Is this Correct?" |
| 23. Scan Bar Code for "yes" or "no". | |
| | 24. If "no" go to action 19 and continue from there. |
| | 25. If "yes" Voice Output Prompts: "Is complete entry review needed?" |
| 26. Scan Bar Code for "yes" or "no". | |
| | 27. If "yes", Voice Output Prompts: "Entries in order are: User is: (User Identifier digits) Transaction is: (Transaction Description) Transaction Function is: (Function selected) Tally Number is: (Tally Number Digits) Lot Number is: (Lot Number Digits) Op Number is: (Op Number Digits) Quantity is: (Quantity Digits) Time is: Hours (hour digits) Minutes (minutes digits) Is this correct?" Continue at Action 29. |
| | 28. If "no" continue at action 31. |
| 29. Scan Bar Code for "yes" or "no". | |
| | 30. If "yes" Voice Output Prompts: "Done - Please Replace Wand in Holster." Continue at action 35. |
| | 31. If "no" Voice Output Prompts: "Do you wish to re-enter?" |
| 32. Scan Bar Code for "yes" or "no" | |
| | 33. If "yes" go to action 2 and continue from there. |
| | 34. If "no" Voice Output Prompts: "Transaction Canceled - Please Replace Wand in Holster." |
| | 35. Go to Idle Standby State. |

Functional blocks, circuits, and portions of the invention not disclosed in detail are well known in the art and made of components readily available on the market. For instance, computer 20 may be a Radio Shack TRS-80, IBM PC, a mainframe, or other like commercially available computer. The ports of the computer are RS-232 serial ASCII 25 pin ports widely available. Bar code decoder unit 44 may be an Intermec model 9300 available from Interface Mechanisms Inc., 4405 Russell Road, P.O. Box N, Lynnwood, Wash. 98036. Voice output generator 42 may be a voice synthesizer output device, Voterm III Responder available from Interstate Electronics of Anaheim, Calif.

The embodiments of the invention in which an exclusive property or right is claimed are defined as follows:

1. A voice prompted bar code reading satellite system comprising:
   a plurality of bar code reading satellite stations, wherein each bar code reading satellite station comprises:
      reading means for optically reading a bar code;
      switching means for active switching of said reading means;
      first indicating means for indicating busy-on said interconnecting means being in active use;
      a logic unit having the properties such that: if said first indicating means indicates a busy said interconnecting means being in active use, then said transforming means, reading means and switching means are disabled; if said first indicating means does not indicate a busy said interconnecting means, then said transforming means, reading means and switching means are enabled; if said switching means is disposed in a way that said reading means is capable of being enabled and if said first indicating means indicates a busy said interconnecting means, then said first indicating means continues to indicate a busy said interconnecting means until said switching is changed in disposition in a way that said reading means is not capable of being enabled; and if said switching means is disposed in a way that said reading means is not capable of being enabled and if said first indicating means does not indicate a busy said interconnecting means, then a busy signal is sent out so that said first indicating means on each of other said satellite stations indicates a busy said interconnecting means and said first indicating means on said station originating said busy signal does not indicate a busy said interconnecting means;
   interconnecting means for interconnecting said plurality of stations;
   decoding means, for decoding bar code signals from said satellite stations, connected to said plurality of stations;
   computing means, for computing said decoded bar code signals from said decoding means, connected to said decoding means; and
   converting means, for converting computer output signals into voice signals to be sent to said satellite stations, connected to said computing means and to said plurality of stations.

2. Apparatus of claim 1 wherein said interconnection means connects said plurality of satellite stations in a daisy-chain fashion.

3. Apparatus of claim 1 wherein said computing means provides signals comprising prompts, instructions, validations of inputted data, repeats, and controls on transactions, in accordance with a program.

4. Apparatus of claim 1 further comprising at least one base station having said decoding means and said converting means.

5. Apparatus of claim 4 wherein said base station further comprises a multiplexing means for multiplexing signals between said computing means and said decoding and said converting means.

6. Apparatus of claim 4 wherein said base station is connected to at least one said plurality of satellite stations.

7. Apparatus of claim 1 wherein said reading means is a laser scanner.

8. Apparatus of claim 1 wherein said reading means is a scanning wand.

9. Apparatus of claim 1 wherein said reading means is a light pen.

10. Apparatus of claim 1 wherein said switching means is an electro-optical coupler.

11. Apparatus of claim 1 wherein said switching means is a reed switch.

12. Apparatus of claim 1 wherein said first indicating means is a visible light indicator.

13. Apparatus of claim 1 wherein said transforming means is a loudspeaker.

14. Apparatus of claim 1 wherein said disabling means is an electro-optical coupler.

15. Apparatus of claim 1 wherein said disabling means is an electro-mechanical relay.

16. Apparatus of claim 1 wherein said disabling means is an electrically controlled normally-closed switch.

17. Apparatus of claim 1 wherein said second indicating means is a tone loudspeaker.

18. Apparatus of claim 1 wherein said transforming means and second indicating means are one loudspeaker.

19. Apparatus of claim 1 wherein said transforming means, said first indicating means and second indicating means are one sound means for emanating sound.

* * * * *